US012698810B2

(12) United States Patent
Jung et al.

(10) Patent No.: US 12,698,810 B2
(45) Date of Patent: Aug. 4, 2026

(54) MECHANICAL REVERSE ROTATION PREVENTION DEVICE FOR CANNED MOTOR PUMP

(71) Applicant: HYOSUNG GOODSPRINGS, INC., Seoul (KR)

(72) Inventors: Jae Won Jung, Changwon-si (KR); Hyeong Hoon Kim, Busan (KR); Jong Bum Kim, Gimhae-si (KR); Hyeon Sig Kim, Changwon-si (KR)

(73) Assignee: HYOSUNG GOODSPRINGS, INC., Seoul (KR)

( * ) Notice: Subject to any disclaimer, the term of this patent is extended or adjusted under 35 U.S.C. 154(b) by 24 days.

(21) Appl. No.: 19/032,492

(22) Filed: Jan. 21, 2025

(65) Prior Publication Data

US 2026/0132826 A1     May 14, 2026

(30) Foreign Application Priority Data

Nov. 13, 2024     (KR) ........................ 10-2024-0160724

(51) Int. Cl.
F16D 41/07          (2006.01)
F16D 66/00          (2006.01)
F04D 13/06          (2006.01)

(52) U.S. Cl.
CPC ............. F16D 41/07 (2013.01); F16D 66/00 (2013.01); *F04D 13/0606* (2013.01); *F16D 2066/006* (2013.01)

(58) Field of Classification Search
CPC ............. F16D 41/07; F16D 2041/0603; F16D 66/00–66/028; F04D 13/0606–13/064
USPC ......................................... 192/223; 188/82.8
See application file for complete search history.

(56) References Cited

U.S. PATENT DOCUMENTS

2023/0358247 A1 * 11/2023 Yamarthi ................ F04D 25/02

FOREIGN PATENT DOCUMENTS

JP          H09151964 A  * 6/1997 ............. F16D 41/07
KR          101473804 B1 * 12/2014 ......... F04D 15/0245
KR          10-1580526 B1  12/2015

* cited by examiner

*Primary Examiner* — Richard M Lorence
(74) *Attorney, Agent, or Firm* — Revolution IP, PLLC

(57)          ABSTRACT

A reverse rotation prevention device for a canned motor pump includes: a rotor 110 rotating together with a main shaft of a motor; a stator 120 provided to be spaced at a first distance apart from an outer peripheral surface of the rotor 110; a plurality of hinges 130 arranged parallel to the main shaft, positioned between the outer peripheral surface of the rotor 110 and an inner peripheral surface of the stator 120, and placed at a preset interval on a circumference spaced a second distance apart from the outer peripheral surface of the rotor 110, the second distance being half the first distance; and a plurality of wedges 140 rotatably connected to the plurality of hinges 130, and rotating in one direction due to centrifugal force according to a flow direction of fluid F provided in a space formed between the rotor 110 and the stator 120.

2 Claims, 7 Drawing Sheets

FIG. 4

MECHANICAL REVERSE ROTATION PREVENTION DEVICE FOR CANNED MOTOR PUMP

CROSS-REFERENCE TO RELATED APPLICATION

This application claims the benefit of and priority to Korean Patent Application No. 10-2024-0160724 filed on Nov. 13, 2024, the entire disclosure(s) of which is hereby incorporated herein by reference in its entirety.

BACKGROUND

The present disclosure relates to a mechanical reverse rotation prevention device for a canned motor pump, and more specifically, to a mechanical reverse rotation prevention device for a canned motor pump, which does not require an external power supply or lubricating oil supply and operates stably without any additional auxiliary devices.

In general, a system composed of a motor and a pump employs a method in which the motor and pump are connected by coupling to drive the pump. At this point, a reverse rotation prevention device is mainly installed in the form of a ball bearing on the motor side. The ball-bearing type reverse rotation prevention device needs an external lubricating oil supply and requires periodic replacement as the device wears out. Therefore, maintenance and management are essential for such a bearing-type reverse rotation prevention device.

A canned motor pump has a structure in which a motor and pump are integrally combined as one unit. The major feature is that there is no leakage due to the absence of a shaft. For this reason, the canned motor pump is mainly used in situations where liquids containing radiation or hazardous liquids are handled, which are dangerous if exposed to the outside. The canned motor pump may ensure high safety in such environments.

However, due to the structural characteristics of the canned motor pump, there is a problem in that lubricating oil or bearing oil cannot be supplied from the outside. The existing ball-bearing type reverse rotation prevention device is not suitable for such a system and have limitations in application to a canned motor pump. The ball-bearing type reverse rotation prevention device requires periodic maintenance due to lubricating oil supply and wear, but the canned motor pump is not capable of such maintenance.

Korean Patent No. 10-1580526, which is proposed as one of the existing technologies, discloses an actuator-type reverse rotation prevention device. However, this method requires electrical energy, and there is a problem that the device may not work if a power supply is interrupted in an accident situation. In addition, because the electrical energy is used, auxiliary devices such as a sensor to check the direction of rotation, a power supply, and cables are required. These auxiliary devices require separate management and maintenance, which may complicate the system.

Therefore, existing technologies have several problems due to external lubricant supply issues and dependence on electric energy. To solve such problems, research is required on a mechanical reverse rotation prevention device for a canned motor pump that does not require an external power supply or lubricating oil supply and operates stably without any auxiliary devices.

PRIOR LITERATURE

Patent Literature

Korean Patent No. 10-1580526

SUMMARY

In view of the above, the present disclosure provides a mechanical reverse rotation prevention device applicable to a canned motor pump, the device in which an external lubricating oil supply is unnecessary and a motor and a pump are integrally combined as one unit.

The present disclosure also provides a reverse rotation prevention device that does not use electric energy and is capable of operating stably even when a power supply is interrupted.

The present disclosure also provides a mechanical reverse rotation prevention device for a canned motor pump, the device which is capable of detecting wear and status changes in real time to ensure performance without any external auxiliary devices or maintenance and management.

A reverse rotation prevention device for a canned motor pump according to one embodiment of the present disclosure includes: a rotor 110 rotating together with a main shaft of a motor; a stator 120 provided to be spaced at a first distance apart from an outer peripheral surface of the rotor 110; a plurality of hinges 130 arranged parallel to the main shaft, positioned between the outer peripheral surface of the rotor 110 and an inner peripheral surface of the stator 120, and arranged at a preset interval on a circumference spaced a second distance apart from the outer peripheral surface of the rotor 110, the second distance being half the first distance; and a plurality of wedges 140 rotatably connected to the plurality of hinges 130, and rotating in one direction due to centrifugal force according to a flow direction of fluid F provided in a space formed between the rotor 110 and the stator 120, wherein during normal rotation, a gap D is formed between each of plurality of wedges 140 and the rotor 110 so that fluid F passes therethrough, and during reverse rotation, one end of each of the plurality of wedges 140 returns to a position where to contact the outer peripheral surface of the rotor 110 by a center of gravity provided at one point of a corresponding one of the plurality of wedges 140, while the other end of the corresponding one of the plurality of wedges 140 contacts the inner peripheral surface of the stator 120, thereby eliminating the gap D to limit the reverse rotation of the rotor 110.

In addition, the plurality of wedges 140 according to one embodiment of the present disclosure may have a longest distance in a cross-section taken along in a direction perpendicular to the plurality of hinges 130 is longer than the first distance, the plurality of wedges 140 may be provided in a space between a pair of bearings coupled to the main shaft, and a tolerance of the plurality of wedges may be larger than a tolerance of the bearings.

The reverse rotation prevention device according to one embodiment of the present disclosure may further include a sensor unit for monitoring a status of the plurality of wedges 140 and the rotor 110, wherein the sensor unit measures a rotational angle of each of the plurality of wedges 140 and a rotational speed of the rotor 110, and detects wear and status changes through comparison with a preset normal operating state, wherein the status change is configured to generate a warning signal based on a wear index M calculated according to the following [Equation 1], wherein the warning signal is generated when the M exceeds a threshold value Mth.

$$M = \Delta\theta \times k_1 + \Delta v \times k_2 \qquad \text{[Equation 1]}$$

Where M denotes a wear index, $\Delta\theta$ denotes a change in rotational angle of each of the plurality of wedges 140, $\Delta v$ denotes a change in speed of the rotor 110, and $k_1$ and $k_2$ denote correction factors for respective variables.

A mechanical reverse rotation prevention device for a canned motor pump according to one embodiment of the present disclosure has the advantage of being applicable to a canned motor pump in which a motor and a pump are integrally combined as one unit without an external lubricating oil supply.

In addition, the mechanical reverse rotation prevention device, according to one embodiment of the present disclosure, has the advantage of not using electric energy while operating stably even when a power supply is interrupted.

In addition, the mechanical reverse rotation prevention device for the canned motor pump, according to one embodiment of the present disclosure, has the advantage of ensuring performance by detecting a wear status and changes of the device in real-time without any external auxiliary devices or without maintenance and management.

BRIEF DESCRIPTION OF THE DRAWINGS

FIG. 4 is a cross-sectional view showing a mechanical reverse rotation prevention device of a forward-rotating canned motor pump according to one embodiment of the present disclosure.

DETAILED DESCRIPTION

Hereinafter, specific embodiments of the present disclosure will be described in detail with reference to the drawings. However, the spirit of the present disclosure is not limited to the embodiments presented herein, and those skilled in the art, understanding the spirit of the present disclosure, may readily propose other embodiments that fall within the same scope of the present disclosure by adding, modifying, or deleting components, or through other retrogressive inventions, and such embodiments shall also be considered within the scope of the present disclosure.

Hereinafter, a mechanical reverse rotation prevention device 100 for a canned motor pump of the present disclosure will be described in detail with reference to the accompanying drawings FIGS. 1 to 6.

Figure 1:
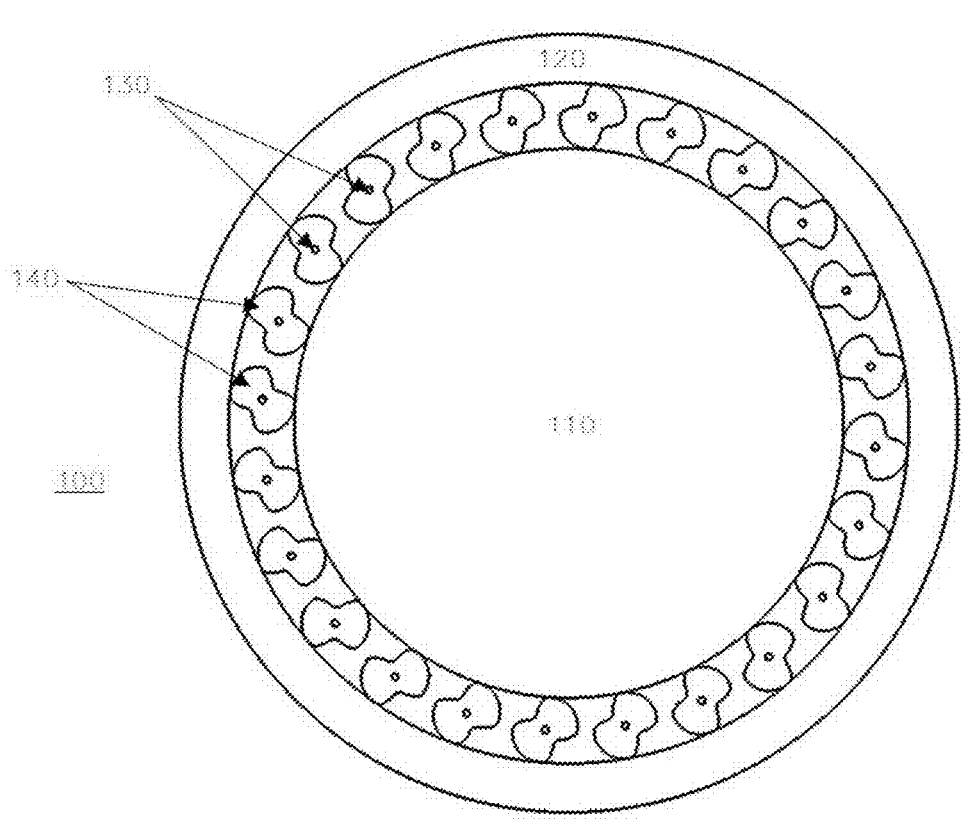
FIG. 1 is a cross-sectional view showing a mechanical reverse rotation prevention device for a canned motor pump according to one embodiment of the present disclosure.
Figure 2:
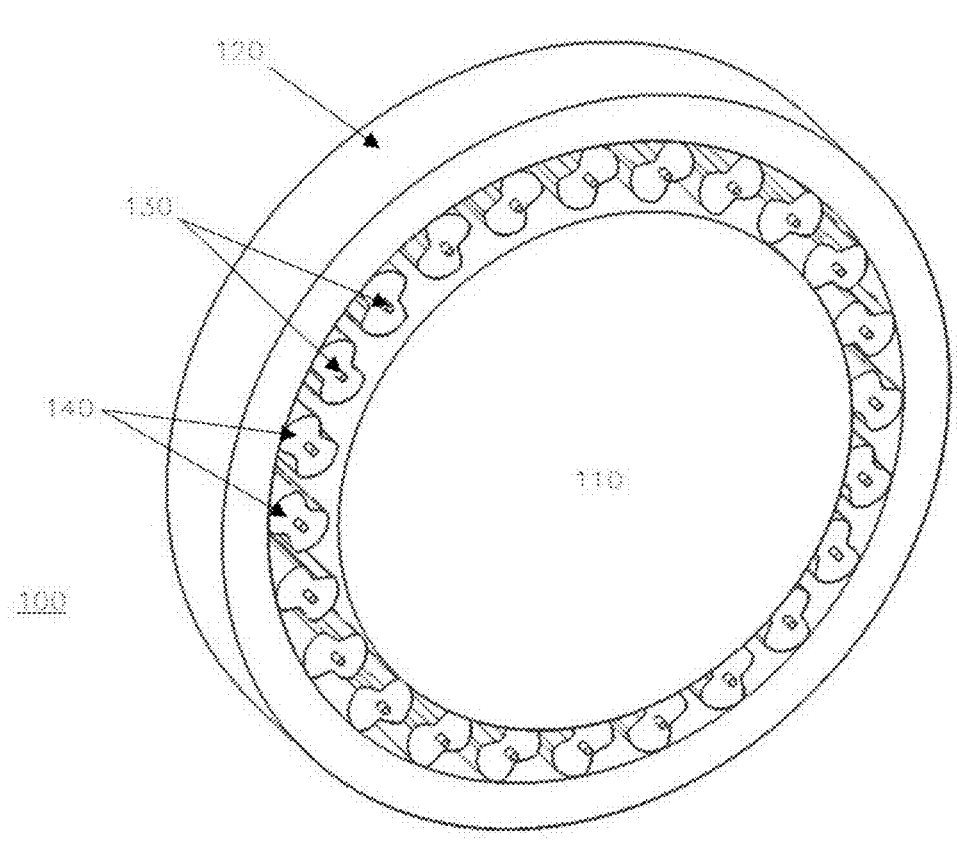
FIG. 2 is a cross-sectional perspective view showing a mechanical reverse rotation prevention device for a canned motor pump according to one embodiment of the present disclosure.
Figure 3:
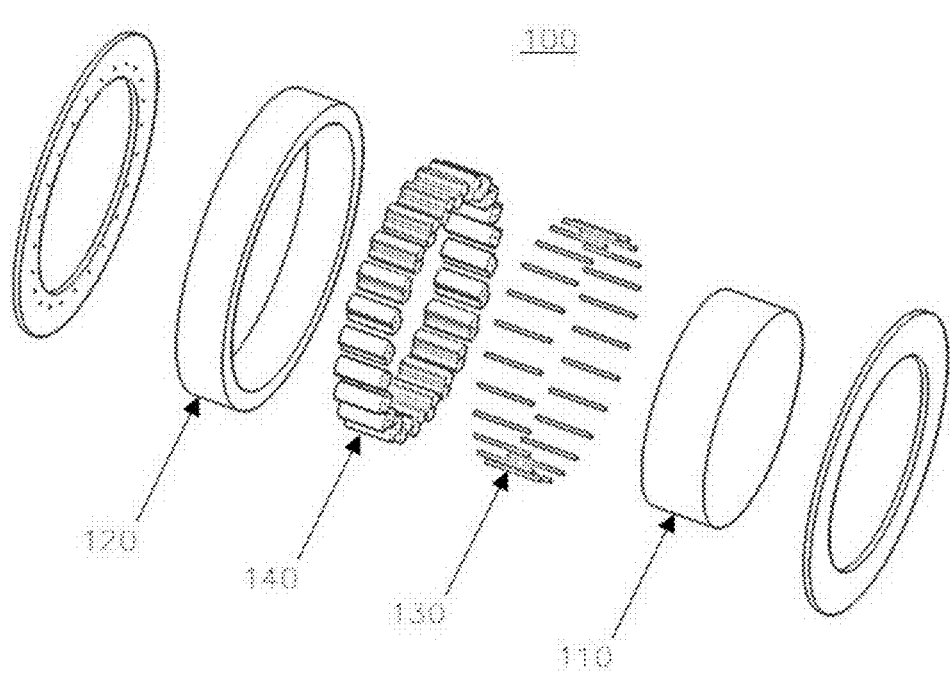
FIG. 3 is an exploded view of a mechanical reverse rotation prevention device for a canned motor pump according to one embodiment of the present disclosure.
Figure 4:
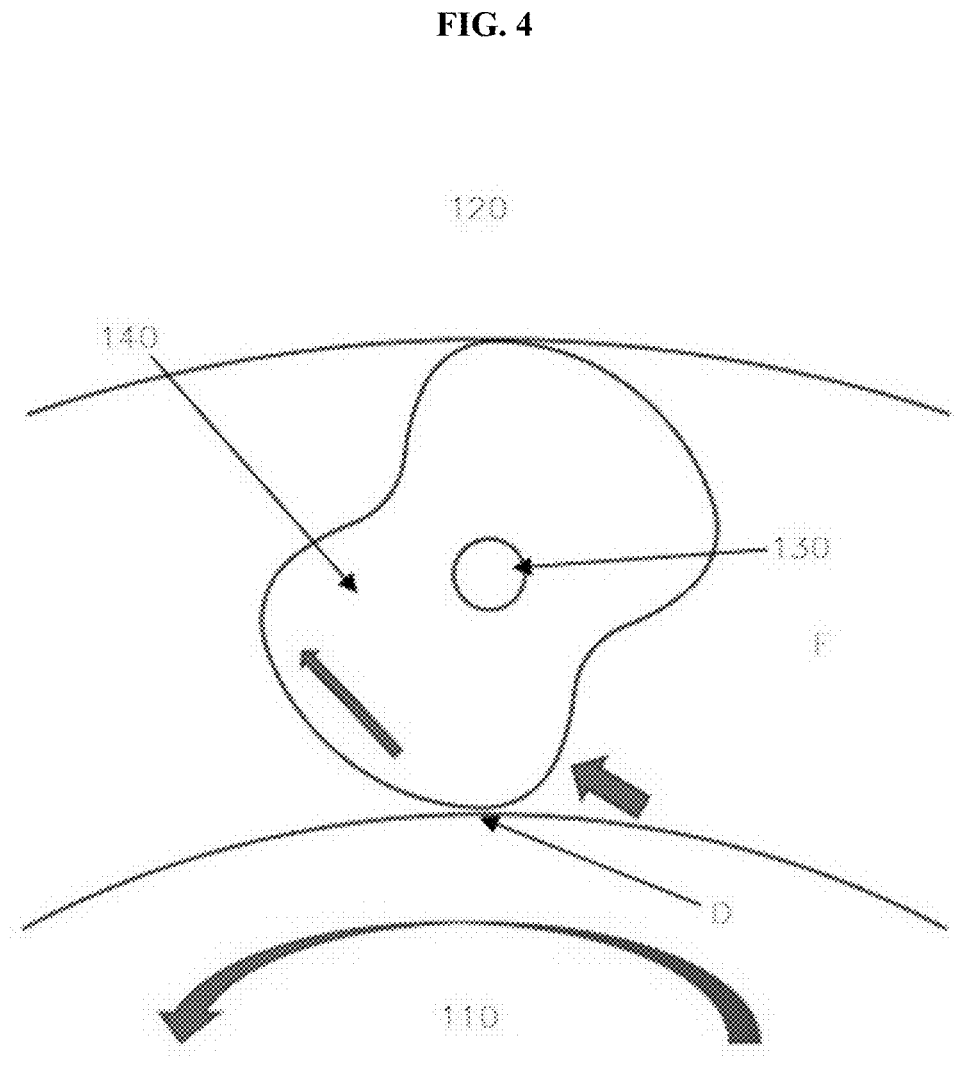
Figure 5:
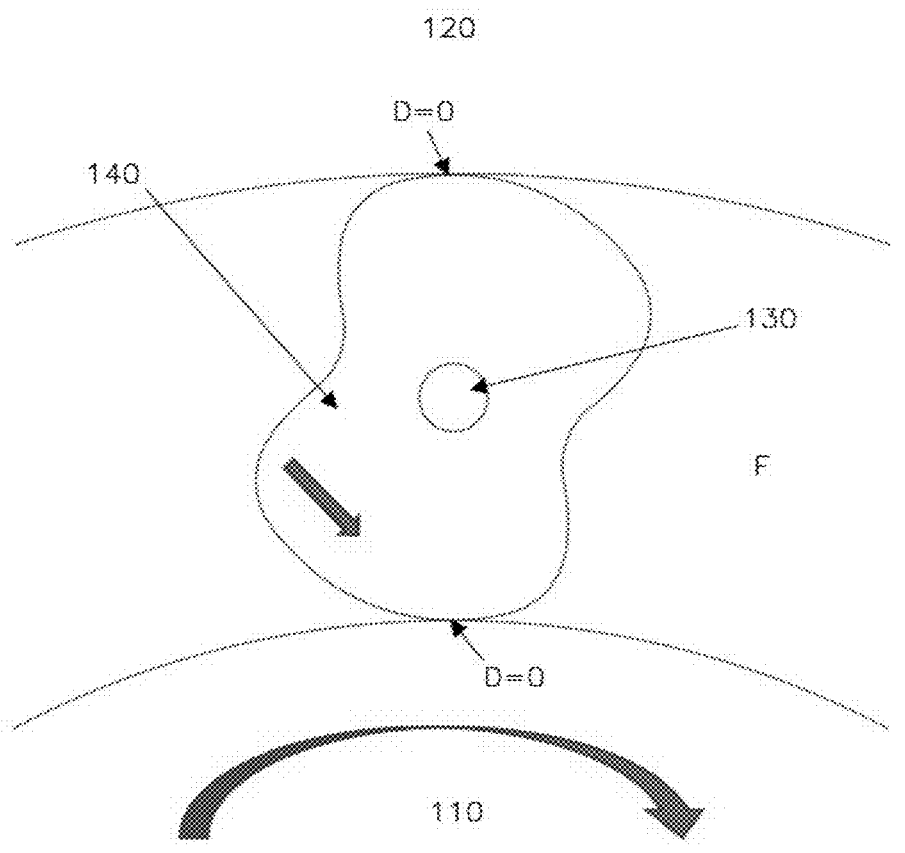
FIG. 5 is a cross-sectional view showing a mechanical reverse rotation prevention device of a reverse-rotating canned motor pump according to one embodiment of the present disclosure.

FIG. 1 is a cross-sectional view showing a mechanical reverse rotation prevention device for a canned motor pump according to one embodiment of the present disclosure; FIG. 2 is a cross-sectional perspective view showing a mechanical reverse rotation prevention device for a canned motor pump according to one embodiment of the present disclosure; FIG. 3 is an exploded view of a mechanical reverse rotation prevention device for a canned motor pump according to one embodiment of the present disclosure; FIG. 4 is a cross-sectional view showing a mechanical reverse rotation prevention device of a forward-rotating canned motor pump according to one embodiment of the present disclosure; and FIG. 5 is a cross-sectional view showing a mechanical reverse rotation prevention device of a reverse-rotating canned motor pump according to one embodiment of the present disclosure.

Referring to FIGS. 1 to 5, the reverse rotation prevention device 100 according to one embodiment of the present disclosure may include a rotor 110, a stator 120, a plurality of hinges 130, and a plurality of wedges 140.

The rotor 110 may rotate together with a main shaft of a motor.

The stator 120 may be provided at a first distance from an outer peripheral surface of the rotor 110.

The plurality of hinges 130 may be arranged parallel to the main shaft, positioned between the outer peripheral surface of the rotor 110 and an inner peripheral surface of the stator 120, and placed at a preset interval on a circumference spaced a second distance, which is half the first distance, apart from the outer peripheral surface of the rotor 110. The plurality of hinges 130 is a part that connects the plurality of wedges 140 so that the plurality of wedges 140 rotates between the rotor 110 and the stator 120. The plurality of hinges 130 may each serve as a shaft that allows the plurality of wedges 140 to rotate in one direction due to centrifugal force of fluid. In addition, the plurality of hinges 130 may ensure stable operation centered on the rotation of the plurality of wedges 140. The plurality of hinge 130 may be formed of a durable material and minimize wear even during long-term use of the device.

The plurality of wedges 140 may be rotatably connected to the plurality of hinge 130 and rotate in one direction due to centrifugal force according to a flow direction of fluid F provided in a space formed between the rotor 110 and the stator 120. The plurality of wedges 140 may have a longest distance in a cross-section taken along in a direction perpendicular to the plurality of hinge 130 longer than the first distance, and the plurality of wedges 140 may be provided in a space between a pair of bearings coupled to the main shaft. Of course, the rotor 110, the stator 120, the plurality of hinges 130, and the plurality of wedges 140 may all be provided in the space between the pair of bearings. As the rotor 110, the stator 120, the plurality of hinges 130, and the plurality of wedges 140 are provided in the space between the bearings, the bearings may be aligned concentrically. The bearings may be provided as dynamic-pressure and static-pressure sleeve bearings, and a surface of each of the bearings may be treated with an overlay weld build-up coating and a DLC coating.

Additionally, a tolerance of the plurality of wedges 140 may be set to be larger than a tolerance of the bearings.

Additionally, the plurality of wedges 140 may be rotatably connected to the hinge 130 to rotate in one direction according to a flow of fluid. The plurality of wedges 140 may control the flow of fluid by forming or eliminating a gap D between the rotor 110 and the stator 120 while rotating due to centrifugal force. The plurality of wedges 140 may be formed of a material with excellent wear resistance and may be designed to withstand impact and wear occurring during rotation.

In addition, during normal rotation, a gap D may be formed between each of the plurality of wedges 130 and the rotor 110 so that the fluid F passes through.

In addition, as shown in FIG. 5, during reverse rotation, one end of each of the plurality of wedges 140 returns to a position where to contact the outer peripheral surface of the rotor 110 by the center of gravity 141 provided at one point of a corresponding one of the plurality of wedges 140, while the other end of the corresponding one of the plurality of wedges 140 contacts the inner peripheral surface of the stator 120, thereby eliminating the gap D to limit the reverse rotation of the rotor 110. The center of gravity 141 will be described in more detail with reference to FIG. 6.

Figure 6:
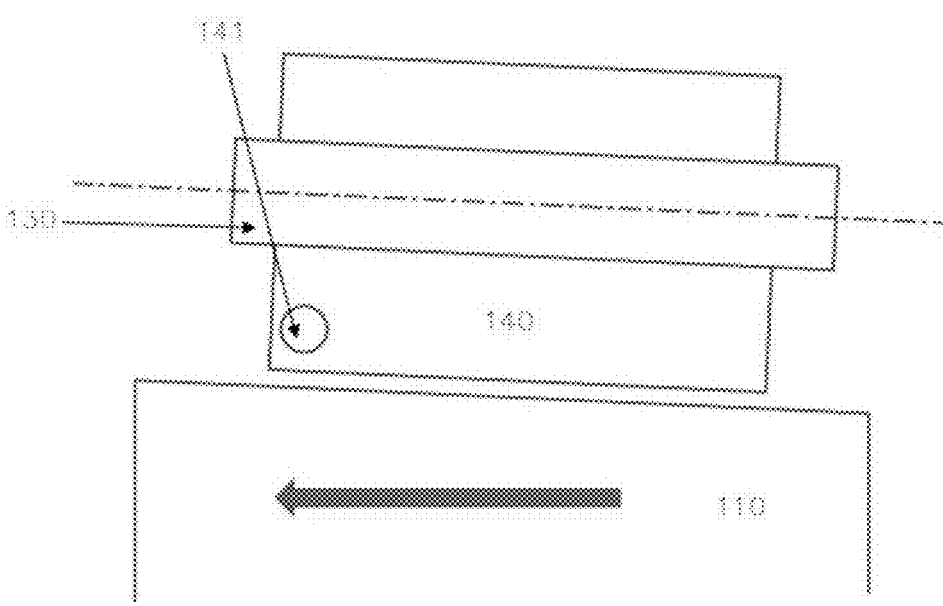
FIG. 6 is a cross-sectional view showing a mechanical reverse rotation prevention device for a canned motor pump including a center of gravity according to one embodiment of the present disclosure.

FIG. 6 is a cross-sectional view showing a mechanical reverse rotation prevention device for a canned motor pump, including a center of gravity, according to one embodiment of the present disclosure.

Referring to FIG. 6, the center of gravity 141 is provided at one point of each of the plurality of wedges 140 to limit the reverse rotation of the rotor 110. Additionally, the center of gravity 141 may play an important role in controlling stable rotation and movement of the plurality of wedges 140. The center of gravity 141 may allow each of the plurality of wedges 140 to rotate at a predetermined angle about a corresponding one of the plurality of hinges 130 during normal rotation, and may also allow each of the plurality of wedges 140 to return to a position where to contact the rotor 110 to prevent reverse flow during reverse rotation. The center of gravity 141 may serve to rotate one end of each of the plurality of wedges 140 toward the rotor 110 and the other end toward the stator 120. Thus, the plurality of wedges 140 may be designed to block a flow of fluid during reverse rotation. In addition, the center of gravity 141 according to one embodiment of the present disclosure may be formed of a different material inside each of the plurality of wedges 140, further strengthening a rotational motion and reverse rotation prevention function of the plurality of wedges 140. The center of gravity 141 is positioned at a fixed position inside each of the plurality of wedges 140 and is designed to maintain a stable rotational force during normal rotation.

Additionally, an arrow shown in FIG. 6 indicates a direction of gravity. In a pump in which the rotor 110 is installed in a vertical direction, as shown in the embodiment of FIG. 6, when a rotational speed of the rotor 110 becomes 0 or reversed, the fluid F acts in the opposite direction and the plurality of wedges 140 may be restored by gravity.

Additionally, the material of the center of gravity 141 may be formed mainly of a high-density metal material. High-density metals are designed to maintain a constant center of gravity, and increases rotational stability during rotation of the plurality of wedges 140. Specifically, high-density metals such as tungsten or platinum may be used, which provide strong durability and are suitable for long-term use of the device. The high-density metal material helps the plurality of wedges 140 to react quickly when rotating in reverse, so that the plurality of wedges 140 can come into close contact with the rotor 110.

The center of gravity 141 is manufactured by providing a separate space into which the center of gravity 141 can be inserted in each of the plurality of wedges 140. The space for inserting the center of gravity 141 is formed using a machining process inside each of the plurality of wedges 140. The machining process mainly uses processes such as milling or drilling to create a space at the center of each of the plurality of wedges 140 where the center of gravity 141 can be accurately fixed, and the center of gravity 141 is fixed in this space by a press-fitting or adhesive method.

The method for placing the center of gravity 141 inside each of the plurality of wedges 140 may be divided into two processes. The first method is a press-fitting method, by which the center of gravity 141 is precisely fitted into the space inside each of the plurality of wedges 140 through a fine tolerance, thereby forming a strong bond. This method ensures that the center of gravity is stably fixed inside without any additional adhesives or fasteners. The second method is an adhesive method, by which the center of gravity 141 is fixed inside each of the plurality of wedges 140 using a high-strength, heat-resistant adhesive. This method may be designed so that the center of gravity does not change even in high-temperature and high-pressure environments.

In addition, each of the plurality of wedges 140 in which the center of gravity 141 is inserted is finally completed in outer shape through a precise machining process, and the outer shape of each wedge 140 and the shape of the center of gravity 141 inserted therein are adjusted to exactly match. This allows the plurality of wedges 140 to exhibit optimal performance in both forward rotation and reverse rotation.

Finally, an outer surface of the center of gravity 141 may have a wear-resistant coating applied thereto, which may reduce wear occurring during long-term use of the device and further increase the durability of the plurality of wedges 140. This method for fixing and manufacturing the center of gravity 141 contributes to stably controlling the movement of the plurality of wedges 140 and maximizing the reverse rotation prevention performance.

Figure 7:
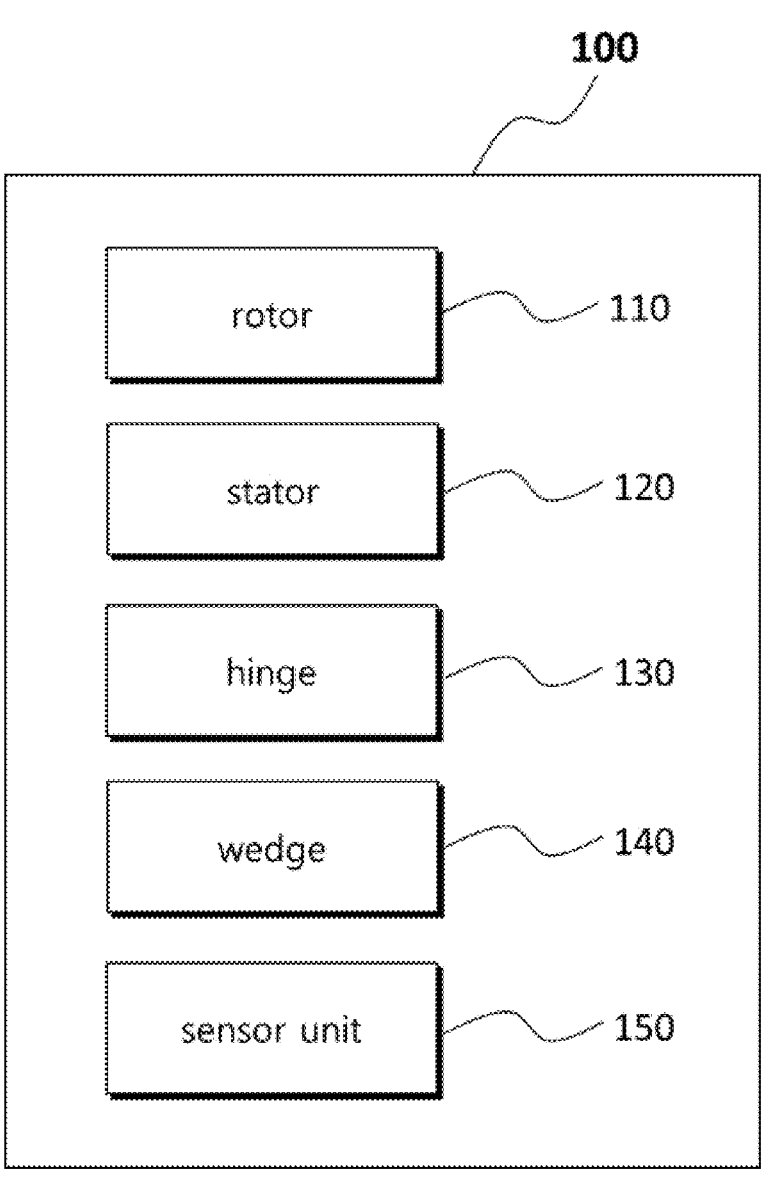
FIG. 7 is a block diagram showing a mechanical reverse rotation prevention device for a canned motor pump according to one embodiment of the present disclosure.

In addition, referring to FIG. 7, the mechanical reverse rotation prevention device 100 for the canned motor pump according to one embodiment of the present disclosure may further include a sensor unit 150 that monitors a status of the plurality of wedges 140 and the rotor 110.

The sensor unit 150 is characterized by measuring a rotational angle of each of the plurality of wedges 140 and a rotational speed of the rotor 110, detecting wear and a change in status by comparing measurements with a preset normal operating state, and generating a warning signal based on a wear index M calculated according to the following Equation [1] when a change in the status is detected, wherein a warning signal is generated when the M exceeds a threshold value Mth.

$$M = \Delta\theta \times k_1 + \Delta v \times k_2 \qquad \text{[Equation 1]}$$

where M denotes a wear index, $\Delta\theta$ denotes a change in rotational angle of each of the plurality of wedges 140, $\Delta v$ denotes a change in speed of the rotor 110, and $k_1$ and $k_2$ denote correction factors for respective variables.

In addition, the sensor unit 150 may measure the rotational angle and speed in real time through precision sensors respectively placed on the plurality of wedges 140 and the rotor 110. These sensors may include optical sensors, gyroscope sensors, or Hall sensors, and may detect a minute change in the rotational angle of each of the plurality of wedges 140 and a change in the speed of the rotor 110, thereby enabling very accurate tracking of the movement and wear status of the rotor. The sensor unit 150 may transmit measured data to a central control unit to compare and analyze the measured data with preset normal operating values and detect a change in the operating status in real time.

In addition, the sensor unit 150 may calculate the 'predicted wear index Mpred' according to [Equation 2] based on the rotational angle change amount 40 of each of the plurality of wedges 140 and a speed change amount Δv of the rotor 110. This Equation is designed to predict the future wear condition of the device based on past data of the device as well as the current rotational status.

$$M_{pred} = (\Delta\theta \times \alpha_1) + (\Delta v \times \alpha_2) + \left( \int_0^T (M \cdot \beta) dt \right) \qquad \text{[Equation 2]}$$

Here, Mpred denotes a predicted wear index, 40 denotes a change in rotational angle of the plurality of wedges 140, Δv denotes a change in speed of the rotor 110, α1 and α2 denote correction factors for the changes in rotational angle and speed, M denotes a previously calculated wear index, β denotes a coefficient representing a rate of change of the wear index over time, and T denotes a time range to analyze.

The following [Equation 2] may be used to predict a future wear condition based on not only a current condition of the plurality of wedges 140 but also past wear data. In doing so, the sensor unit 150 may predict wear of the plurality of wedges 140 and rotor 110 and accurately determine when proactive maintenance is needed.

The sensor unit 150 may generate a warning signal based on this prediction data, as well as output an adjustment signal to maintain an optimal operating condition of the device. This adjustment signal may be transmitted to the central control unit and used to adjust a rotational speed of a machine or control a flow of fluid. Such features allow the device to maximize the efficiency and provide preventive maintenance to reduce wear.

In addition, the sensor unit 150 may record all operating states and wear conditions of the device through a data logging function, and analyze long-term performance changes based on such records. This data may be linked to a cloud-based remote monitoring system, allowing users to check device status in real-time via a mobile device or computer.

As such, the sensor unit 150 linked to the remote monitoring system may automatically plan a maintenance schedule and prepare for the replacement of necessary parts in advance before wear reaches a threshold.

The sensor unit 150 may be protected with a durable material to operate reliably even in high-temperature and high-pressure environments and to maintain the safety of the device, especially in environments such as a canned motor pump where hazardous liquids are handled. Additionally, the sensor unit 150 may include a function to safely store data even when power is interrupted, and to automatically recover and restart when power is recovered.

As described above, according to one embodiment of the present disclosure, the present disclosure may be applied to a canned motor pump in which a motor and a pump are integrally combined as an integral unit without an external lubricant supply, does not require electric energy, and is capable of operating stably even when a power supply is interrupted.

In addition, the mechanical reverse rotation prevention device for the canned motor pump according to one embodiment of the present disclosure has the advantage of ensuring performance by detecting a wear status and changes of the device in real time without any external auxiliary devices or without maintenance and management.

Although the present disclosure has been described above with a specific embodiment and drawings, the present disclosure is not limited to the above-described embodiment, and various modifications and changes are made from this description by those skilled in the art to which the present disclosure pertains. Accordingly, the embodiments of the present disclosure should be understood only by the claims set forth below, and all equivalent modifications and variations thereof will be considered to be within the scope of the present disclosure.

| [Detailed Description of Main Elements] |
| --- |
| 100: mechanical reverse rotation prevention device for canned motor pump |
| 110: rotor |
| 120: stator |
| 130: hinge |
| 140: wedge |
| 141: center of gravity |
| D: gap |
| F: fluid |

What is claimed is:

1. A reverse rotation prevention device comprising:

a rotor;

a stator provided to be spaced at a first distance apart from an outer peripheral surface of the rotor;

a plurality of hinges positioned between the outer peripheral surface of the rotor and an inner peripheral surface of the stator, and placed at a preset interval on a circumference spaced a second distance apart from the outer peripheral surface of the rotor, the second distance being half the first distance;

a plurality of wedges rotatably connected to the plurality of hinges, and rotating in one direction due to centrifugal force according to a flow direction of fluid provided in a space formed between the rotor and the stator; and a sensor unit for monitoring a status of the plurality of wedges and the rotor, wherein during normal rotation, a gap is formed between each of plurality of wedges and the rotor so that fluid passes therethrough, and during reverse rotation, one end of each of the plurality of wedges returns to a position where to contact the outer peripheral surface of the rotor by a center of gravity provided at one point of a corresponding one of the plurality of wedges, while the other end of the corresponding one of the plurality of wedges contacts the inner peripheral surface of the stator, thereby eliminating the gap to limit the reverse rotation of the rotor, wherein the sensor unit measures a rotational angle of each of the plurality of wedges and a rotational speed of the rotor, and detects wear and status changes through comparison with a preset normal operating state, wherein the status change is configured to generate a warning signal based on a wear index M calculated according to the following [Equation 1], wherein the warning signal is generated when the M exceeds a threshold value Mth, $$M = \Delta\theta \times k_1 + \Delta v \times k_2 \qquad \text{[Equation 1]}$$

where M denotes a wear index, $\Delta\theta$ denotes a change in rotational angle of each of the plurality of wedges, $\Delta v$ denotes a change in speed of the rotor, and $k_1$ and $k_2$ denote correction factors for respective variables.

2. The reverse rotation prevention device of claim 1, wherein the plurality of wedges has a longest distance in a cross-section taken along in a direction perpendicular to the plurality of hinges is longer than the first distance.

* * * * *